(12) United States Patent
Baldwin et al.

(10) Patent No.: US 10,643,353 B2
(45) Date of Patent: May 5, 2020

(54) CONTRAST-RATIO-BASED COLOR GENERATION

(71) Applicant: Adobe Inc., San Jose, CA (US)

(72) Inventors: Nathan Douglas Baldwin, Saratoga Springs, UT (US); Lindsay Ann Browne, Covington, WA (US); Johnny Hunter, San Francisco, CA (US); Alan Grant Wilson, Cedar Hills, UT (US)

(73) Assignee: Adobe Inc., San Jose, CA (US)

( * ) Notice: Subject to any disclaimer, the term of this patent is extended or adjusted under 35 U.S.C. 154(b) by 57 days.

(21) Appl. No.: 16/109,684

(22) Filed: Aug. 22, 2018

(65) Prior Publication Data
US 2020/0066003 A1 Feb. 27, 2020

(51) Int. Cl.
| | |
|---|---|
| G06T 11/00 | (2006.01) |
| G06T 5/00 | (2006.01) |
| G09G 5/02 | (2006.01) |
| G09G 5/28 | (2006.01) |
| G09G 5/30 | (2006.01) |
| H04N 1/60 | (2006.01) |
| H04N 5/57 | (2006.01) |
| H04N 9/64 | (2006.01) |
| G06F 3/048 | (2013.01) |

(52) U.S. Cl.
CPC ........ *G06T 11/001* (2013.01); *G06T 2200/24* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,319,116 | B1* | 6/2019 | C | G06F 3/04845 |
| 2006/0227149 | A1* | 10/2006 | Cain | G09G 5/02 |
| | | | | 345/594 |
| 2007/0110305 | A1* | 5/2007 | Corcoran | G06K 9/00228 |
| | | | | 382/167 |
| 2009/0263016 | A1* | 10/2009 | Kuo | G06T 7/0002 |
| | | | | 382/167 |
| 2014/0037200 | A1* | 2/2014 | Phillips | G06T 7/90 |
| | | | | 382/162 |
| 2016/0351166 | A1* | 12/2016 | Chen | G09G 3/20 |

* cited by examiner

*Primary Examiner* — Wesner Sajous
(74) *Attorney, Agent, or Firm* — SBMC

(57) ABSTRACT

In implementations of contrast-ratio-based color generation, a user interface displays on a display device of a computing device, where the user interface includes a background color and content colors of content displayed in the user interface. A color generation module implemented by the computing device receives an input that changes the background color in the user interface. The color generation module can then calculate a brightness value of the background color, calculate target contrast ratios of the respective content colors based on the brightness value of the background color, generate color values for new content colors based on the calculated target contrast ratios of the respective content colors, calculate respective brightness values of the new content colors based on the generated color values for the new content colors, and adjust a saturation and hue of the new content colors based on the calculated respective brightness values of the new content colors.

20 Claims, 8 Drawing Sheets
(5 of 8 Drawing Sheet(s) Filed in Color)

CONTRAST-RATIO-BASED COLOR GENERATION

BACKGROUND

Many device users have electronic and computing devices, such as desktop computers, laptop computers, mobile phones, tablet computers, multimedia devices, and other similar devices. These types of computing devices are utilized for many different computer applications, to include graphic design, publication development, digital photo image enhancement, and the like. Image color is a fundamental aspect of many art, photography, graphic design, and other visualization projects. Many device users are graphic designers and artists who use editing applications like Adobe Photoshop®, Illustrator®, Lightroom®, and other similar applications. Notably, device users often use more than one of these editing applications in a family of graphic and design-based applications, and a similar color theme may be applied across the family of applications. From a design standpoint, manually creating and maintaining all of the colors that go into developing a color theme can be a static, time-consuming, and inefficient process.

Generally, a user can select the overall color theme of the background color, text color, and the colors of other content displayed in application user interfaces. However, the colors of a selected color theme may not have a uniform appearance across all of the family of applications, and in particular across different devices that have various, different types of displays. Other factors can also affect perception and clarity of the colors in a color theme, such as ambient and environmental light sources, particularly on highly-reflective displays. Generally, ambient light and direct light sources on reflective displays can make darker color themes difficult to see, as well as when working in a dimly lighted or dark environment. Given the environmental, perception, and contextual experiences, device users of the graphic design and editing applications are typically limited to adjusting display screen brightness to adjust for the brightness and/or darkness of their computing environment.

SUMMARY

This Summary introduces features and concepts of contrast-ratio-based color generation, which is further described below in the Detailed Description and shown in the Figures. This Summary should not be considered to describe essential features of the claimed subject matter, nor used to determine or limit the scope of the claimed subject matter.

Aspects of contrast-ratio-based color generation are described. In implementations, a user interface displays on a display device of a computing device, where the user interface includes a background color and content colors of content displayed in the user interface. A color generation module implemented by the computing device can receive an input that changes the background color in the user interface. The color generation module can calculate a brightness value of the background color, as well as determine hue values of the respective content colors. The color generation module can then calculate target contrast ratios of the respective content colors based on the brightness value of the background color and/or based on the determined hue values of the respective content colors. The color generation module is implemented to generate color values for new content colors based on the calculated target contrast ratios of the respective content colors, calculate respective brightness values of the new content colors based on the generated color values for the new content colors, and adjust a saturation and/or a hue of the new content colors based on the calculated respective brightness values of the new content colors.

The content colors are then scalable based on a hue shift and a saturation shift of the respective new content colors for appearance consistency across multiple user interfaces. The adjusted new content colors can then be displayed in the user interface contrasted against the background color according to the calculated contrast ratios of the respective content colors. In implementations, one or more of the adjusted new content colors are displayable in the user interface in conformance with Web Content Accessibility Guidelines (WCAG), contingent on the device application that generates the user interface being implemented to map the new content colors in conformance with the WCAG.

In aspects of contrast-ratio-based color generation, the color generation module implemented by the computing device can receive a brightness value adjustment and/or a contrast value adjustment as a selectable input via the user interface that changes the background color in the user interface. The color generation module can then recalculate the brightness value of the background color, and recalculate the target contrast ratios of the respective new content colors based on the recalculated brightness value of the background color. The color generation module is implemented to generate other color values for revised content colors based on the recalculated target contrast ratios of the respective new content colors, and calculate respective brightness values of the revised content colors based on the generated other color values for the revised content colors. The color generation module is implemented to then adjust a saturation and/or a hue of the revised content colors based on the calculated respective brightness values of the revised content colors and respective hue values of the revised content colors, where the adjusted revised content colors are then displayable in the user interface.

In other aspects of the color generation module for contrast-ratio-based color generation, the color generation module can receive an input as a background color of a user interface, and calculate a brightness value of the background color. The color generation module can also receive an additional input as a content color of content in the user interface, and determine a hue value of the content color. The color generation module can then calculate a contrast ratio of the content color based on the brightness value of the background color and the hue value of the content color. The color generation module can then generate color values for a new content color based on the calculated target contrast ratio of the content color, calculate a brightness value of the new content color based on the generated color values for the new content color, and adjust a saturation and/or a hue of the new content color based on the calculated brightness value of the new content color and a hue value of the new content color. The new content color is scalable based on a hue shift and a saturation shift of the new content color for appearance consistency across multiple user interfaces, and the contrast ratio of the content color is calculated as a contrast of the content color against the background color. In implementations, the color generation module calculates the contrast ratio of the content color based on a color target curve with a multiplier value, where the color target curve associates contrast ratios with respective colors across a color spectrum.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Implementations of contrast-ratio-based color generation are described with reference to the following Figures. The same numbers may be used throughout to reference similar features and components that are shown in the Figures.

DETAILED DESCRIPTION

Figure 1:
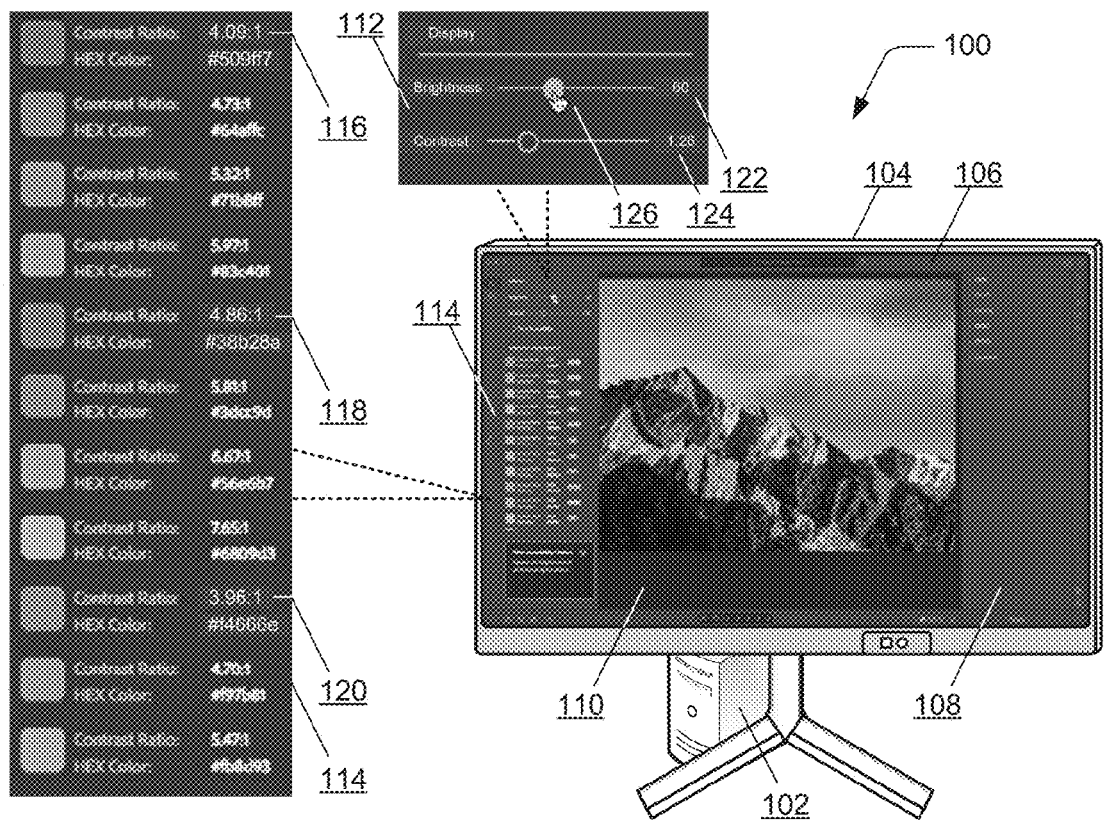
FIG. 1 illustrates an example environment in which aspects of contrast-ratio-based color generation can be implemented.
Figure 1:
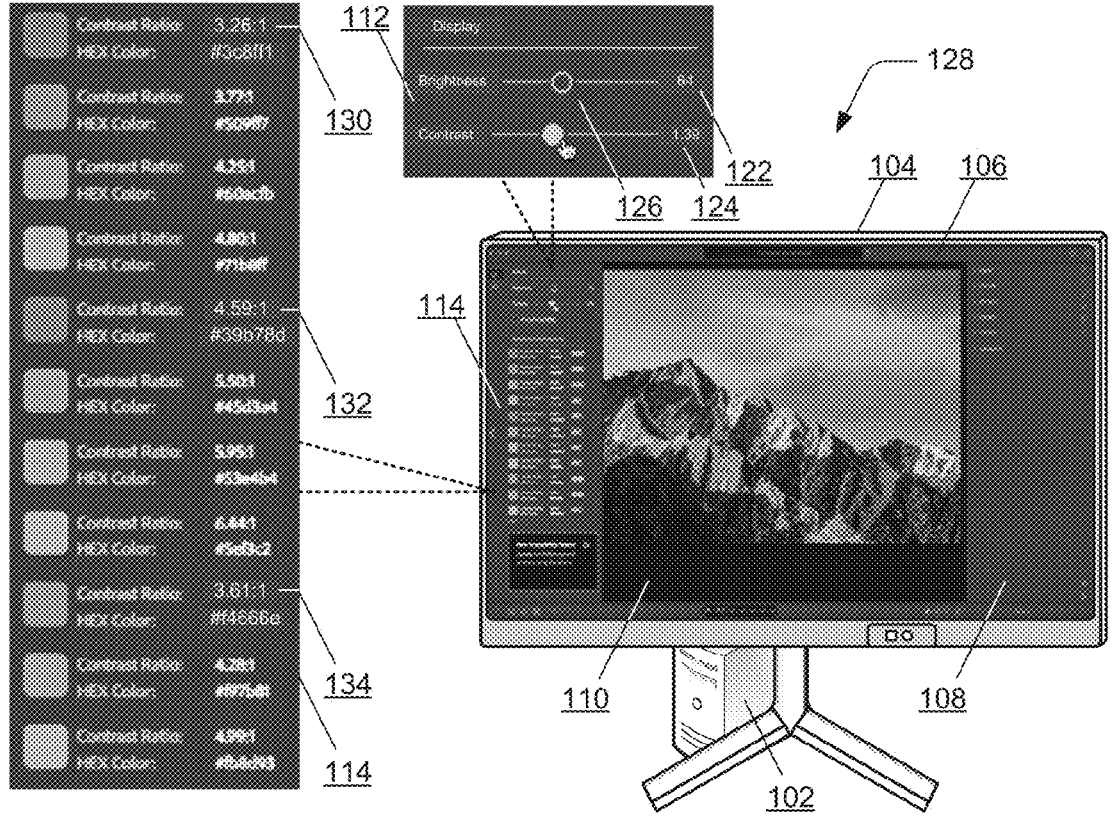

Implementations of contrast-ratio-based color generation are described, and the techniques enable a user to easily adjust the overall brightness and/or darkness associated with the appearance of colors in an application user interface, without affecting the contrast ratios of the colors so as to maintain the visual perception and contextual experience for a user who is viewing the user interface. Generally, contrast ratios are the basis of color generation and the contrast ratios of the colors in a user interface, for example, are the difference between the relative luminance of one color to another. Notably, changing the brightness or darkness of one color in a user interface can affect the perceptible appearance of the other colors in the user interface. For example, the color blue may appear as a different tint or shade of blue to many different people, notably because color is an individualized perception of the combination of hue, saturation, and brightness that combine to provide the appearance of a particular color.

Additionally, the techniques of contrast-ratio-based color generation as described herein provide that colors can be generated in real-time to accommodate user preferences and visual perception, while generally meeting the Web Content Accessibility Guidelines (WCAG) for color contrast. Color themes with one or more color palettes of colors can be generated to maintain a color contrast that endeavors to meet the accessibility guidelines across the color themes for various application user interfaces. In aspects of the described contrast-ratio-based color generation, a user can generate multiple accessible color themes, or easily adjust colors across any number of color themes, while generally adhering to the WCAG for color contrast. This supports the ability to create accessible user interface color palettes by content designers.

A computing device can implement a color generation system, with a color generation module designed to generate contrast-ratio-based user interface colors, such as from user inputs of color hues and background colors. The contrast ratios of the user interface colors are then calculated based on a brightness value of the background color, and the content colors for a color theme can be generated. The color generation module allows for adjustments to the hue and saturation of each color based the brightness value of a color so that the generated colors appear aesthetically appealing and related to one another based on a predetermined target hue shift and saturation shift for any color hue on the color spectrum. The color generation module provides that content designers can create accessible color palettes without having to manually calculate the contrast ratios, which are the basis for the color generation. For any of the colors that are not accessible by default, users can control the color generation for accessibility, which allows the content designers to create color palettes that scale for use across multiple themes by creating unique values for each theme, while generating the colors that are perceptively the same or directly related.

While features and concepts of contrast-ratio-based color generation can be implemented in any number of different devices, systems, networks, environments, and/or configurations, implementations of contrast-ratio-based color generation are described in the context of the following example devices, systems, and methods.

FIG. 1 illustrates an example environment 100 in which aspects of contrast-ratio-based color generation can be implemented. The environment 100 includes a computing device 102 with a display device 104 on which a user interface 106 of an application can be displayed, such as for a graphics design and editing application that may be used for digital photo image enhancement or other similar uses. The user interface 106 includes a background color 108, another region of color 110 below the digital photo, and other content colors of content displayed in the user interface. In this example, the user interface 106 also includes selectable controls 112 that are user-selectable, allowing a user to adjust the brightness and the contrast of the display. The user interface 106 also includes a color palette region 114 that visually represents aspects of contrast-ratio-based color generation as described herein.

The color palette region 114 includes representations of some colors that may correspond to other content displayed in the user interface 106, referred to herein as content colors. In this illustration, four shades of blue, green, red, etc. are displayed as the content colors in the color palette region 114, along with a HEX color identifier of the hue for each color, and the contrast ratio for each color. For example, the first blue color (the top blue color in this illustration identified as HEX color #509ff7) has a contrast ratio 116 of 4.09:1. The first green color (the top green color in this illustration identified as HEX color #38b28a) has a contrast ratio 118 of 4.86:1. Similarly, the first red color (the top red color in this illustration identified as HEX color # f4666e) has a contrast ratio 120 of 3.96:1. The significance of the identified contrast ratios for the colors in the color palette region 114 is the relative luminance of each respective color to the overall background color 108 (e.g., a grey color) at the selected brightness value 122 of sixty (60) and the selected contrast value 124 of 1.26, as a user may set with the respective brightness and contrast selectable controls 112.

A user of the computing device 102 who is interacting via the user interface 106 may adjust the brightness of the user interface 106 with a brightness slider control 126, such as to increase the brightness value 122 from sixty (60) to sixty-four (64), as further shown at 128. Notably, the background color 108 and the region of color 110 below the digital photo in the user interface appear darker in the example illustration of the user interface at 128. This change of the background color 108 in the user interface 106, as a result of the brightness adjustment with the brightness slider control 126, can be received as an input by a color generation module of the computing device. Implementation details of the color generation module is further described with reference to the color generation system shown in FIG. 3.

In aspects of contrast-ratio-based color generation, the color generation module of the computing device 102 is implemented to calculate a brightness value of the background color 108, as well as determine hue values of the content colors of other content displayed in the user interface (e.g., the colors shown in the color palette region 114). The color generation module can then calculate target contrast ratios of the respective content colors based on the brightness value of the background color and based on the determined hue values of the respective content colors. The color generation module is implemented to generate color values (e.g., RGB values) for new content colors based on the calculated target contrast ratios of the respective content colors, calculate respective brightness values of the new content colors based on the generated color values for the new content colors, and then adjust a saturation of the new content colors based on the calculated respective brightness values of the new content colors. Notably, the saturation of a new content color is adjusted based on its own brightness. The adjusted new content colors can then be displayed in the user interface contrasted against the background color 108 according to the calculated contrast ratios of the respective content colors and the adjusted saturation and/or hue of the new content colors based on the calculated brightness values. As described herein, a "new" content color may be a different tint or shade of content color displayed in a user interface, where the new content color has been changed in some aspect of its combination of hue, saturation, and/or brightness.

Notably, the contrast ratio and the HEX color identifier of the hue for each color in the color palette region 114 have been updated, as calculated and generated by the color generation module. For example, the first blue color (the top blue color in this illustration at 128) has been adjusted and is identified as HEX color #3c8ff1 with a calculated contrast ratio 130 of 3.26:1. The first green color (the top green color in this illustration at 128) has been adjusted and is identified as HEX color #39678d with a calculated contrast ratio 132 of 4.59:1. Similarly, the first red color (the top red color in this illustration at 128) has been adjusted and is identified as HEX color # f4666e with a calculated contrast ratio 134 of 3.61:1. The calculated contrast ratios for the colors in the color palette region 114 represent the relative luminance of each respective color to the overall background color 108 (e.g., a grey color) at the selected brightness value 122 of sixty-four (64) and the selected contrast value 124 of 1.39, as a user may set with the respective brightness and contrast selectable controls 112.

In aspects of contrast-ratio-based color generation, the color generation module implemented by the computing device 102 can receive a brightness value adjustment and/or a contrast value adjustment as a selectable input via the user interface 106 that changes the background color 108 in the user interface. The color generation module can then recalculate the brightness value of the background color, and recalculate the target contrast ratios of the respective content colors based on the recalculated brightness value of the background color. The color generation module is implemented to then generate color values for revised content colors (e.g., additional new content colors) based on the recalculated target contrast ratios of the respective content colors, calculate respective brightness values of the revised content colors based on the generated color values for the revised content colors, and adjust a saturation of the revised content colors based on the calculated respective brightness values of the revised content colors, where the adjusted revised content colors are then displayable in the user interface as the updated, new content colors.

Figure 2:
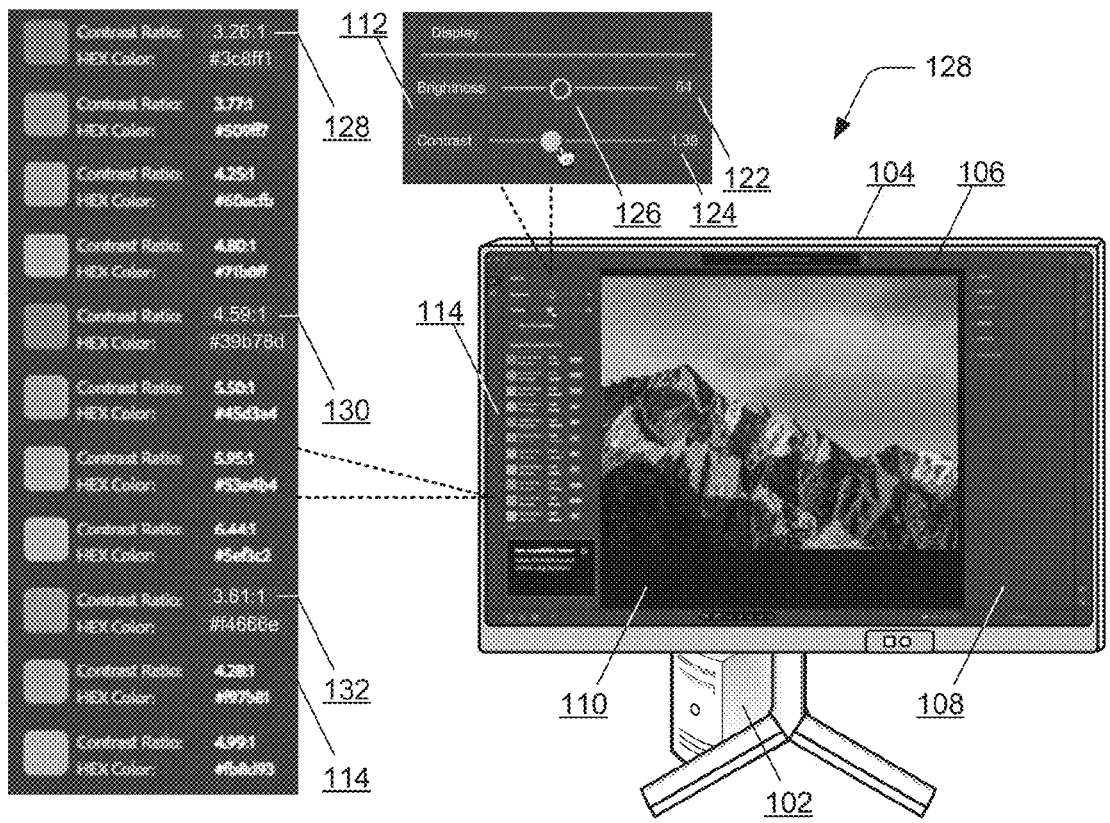
FIG. 2 further illustrates the example environment in which aspects of contrast-ratio-based color generation can be implemented.
Figure 2:
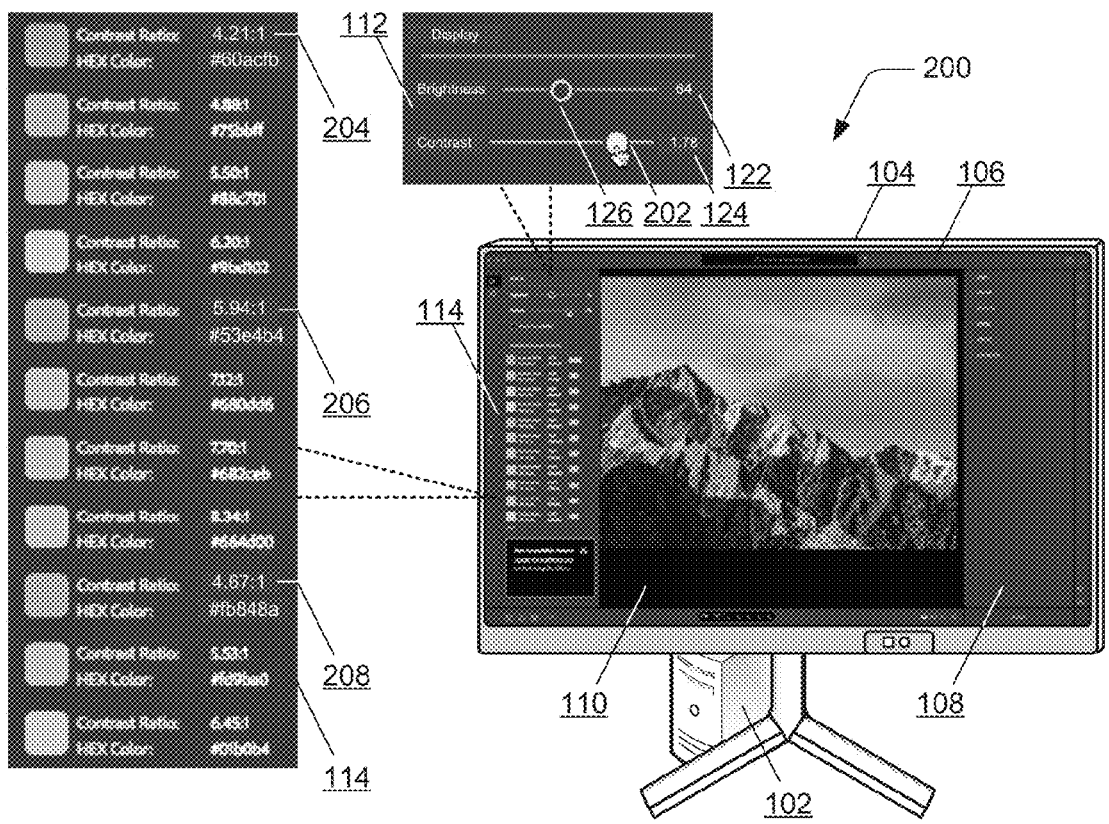

FIG. 2 further illustrates an example 200 of contrast-ratio-based color generation in the example environment 100 shown and described with reference to FIG. 1. In particular, the example 128 as shown in FIG. 1 is reproduced at the top of the illustration for ease of discussion and reference. A user of the computing device 102 who is interacting via the user interface 106 may adjust the contrast of the user interface 106 with a contrast slider control 202, such as to increase the contrast value 124 from 1.39 to 1.78, as shown at 200. Notably, the background color 108 and the region of color 110 below the digital photo in the user interface appear darker in the example illustration of the user interface at 200. This change of the background color 108 in the user interface 106, as a result of the contrast adjustment with the contrast slider control 202, can also be received as an input by the color generation module of the computing device.

In aspects of contrast-ratio-based color generation, the color generation module of the computing device 102 is implemented to recalculate a brightness value of the background color 108, as well as determine the hue values of the content colors of other content displayed in the user interface (e.g., the colors shown in the color palette region 114). The color generation module can then recalculate the target contrast ratios of the respective content colors based on the brightness value of the background color and based on the determined hue values of the respective content colors. The color generation module is implemented to generate color values for the content colors based on the recalculated target contrast ratios of the respective content colors, calculate respective brightness values of the content colors based on the generated color values for the content colors, and adjust a saturation of the content colors based on the calculated respective brightness values of the content colors. The adjusted content colors can then be displayed in the user interface contrasted against the background color 108 according to the calculated contrast ratios of the respective content colors and the adjusted saturation and/or hue of the content colors based on the calculated brightness values.

Notably, the contrast ratio and the HEX color identifier of the hue for each color in the color palette region 114 have been updated, as calculated and generated by the color generation module. For example, the first blue color (the top blue color in this illustration at 200) has been adjusted and is identified as HEX color #60acfb with a calculated contrast ratio 204 of 4.21:1. The first green color (the top green color in this illustration at 200) has been adjusted and is identified as HEX color #53e4b4 with a calculated contrast ratio 206 of 5.94:1. Similarly, the first red color (the top red color in this illustration at 200) has been adjusted and is identified as HEX color # fb848a with a calculated contrast ratio 208 of 4.67:1. The calculated contrast ratios for the colors in the color palette region 114 represent the relative luminance of each respective color to the overall background color 108 (e.g., a grey color) at the selected contrast value 124 of 1.78 and the selected brightness value 122 of sixty-four (64), as a user may set with the respective contrast and brightness selectable controls 112.

Figure 3:
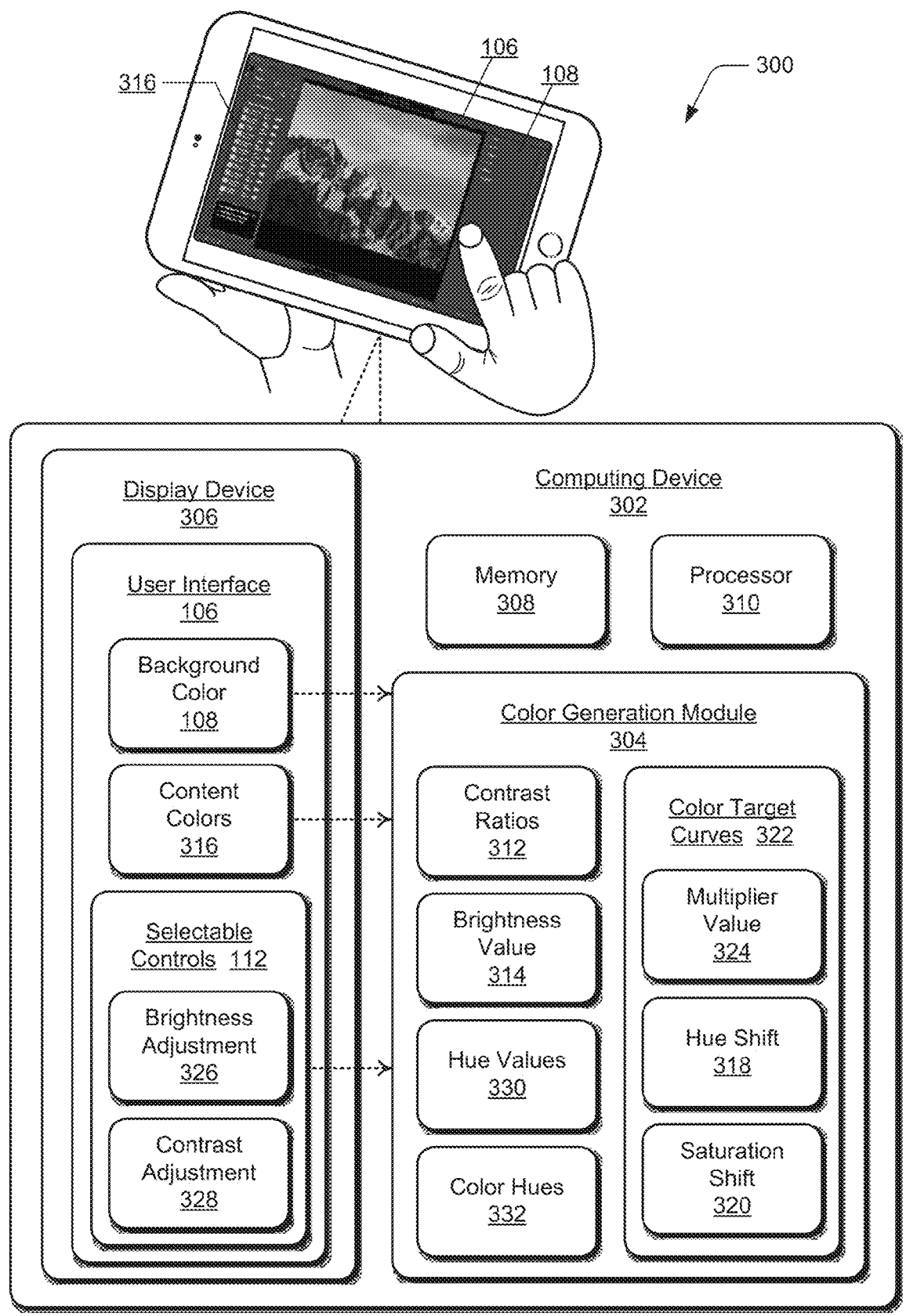
FIG. 3 illustrates an example implementation of a color generation system for contrast-ratio-based color generation in accordance with one or more implementations.

FIG. 3 illustrates an example color generation system 300 implemented with a computing device 302 in aspects of contrast-ratio-based color generation. The example system 300 includes the computing device 302 with the color generation module 304, which implements features of contrast-ratio-based color generation as described herein. The computing device 302 can be implemented as any type of computing device, client device, mobile phone, tablet device, communication, entertainment, gaming, media playback, and/or other type of device. The computing device 302 includes display device 306, which may be an integrated component of the computing device, or alternatively, may be a peripheral component to the computing device. The computing device 302 with an external display device is an example of the computing device 102 with the display device 104, as shown and described with reference to FIGS. 1 and 2.

Although shown and described as a component or system of the computing device 302, the color generation module 304 may also be implemented as an independent system or as part of a cloud-based service system. In this example system 300, the computing device 302 includes memory 308 and a processor 310, and may include any number and combination of different components as further described with reference to the example device shown in FIG. 8. The color generation module 304 may include independent processing, memory, and logic components functioning as a computing and/or electronic device integrated with the computing device 302. Alternatively or in addition, the color generation module 304 can be implemented as a software application or software module, such as computer-executable software instructions that are executable with the processor 310. As a software application, the color generation module 304 can be stored on computer-readable storage memory (e.g., the memory 308), or any suitable memory device or electronic data storage implemented with the color generation module.

Generally, the color generation module 304 is implemented to generate contrast-ratio-based user interface colors, such as from user inputs of color hues and background colors. The contrast ratios 312 are then calculated based on a brightness value 314 of the background color 108, and the content colors 316 for a color theme can be generated. The color generation module 304 allows for adjustments to the hue and saturation of each color based the brightness value of a color so that the generated colors appear aesthetically appealing and related to one another based on a predetermined target hue shift 318 and saturation shift 320 for any color hue on the color spectrum. The color generation module 304 provides that content designers can create accessible color palettes without having to manually calculate the contrast ratios, which are the basis for the color generation. For any of the colors that are not accessible by default, users can control the color generation for accessibility, which allows the content designers to create color palettes that scale for use across multiple themes by creating unique values for each theme, while generating the colors that are perceptively the same or directly related.

Figure 4:
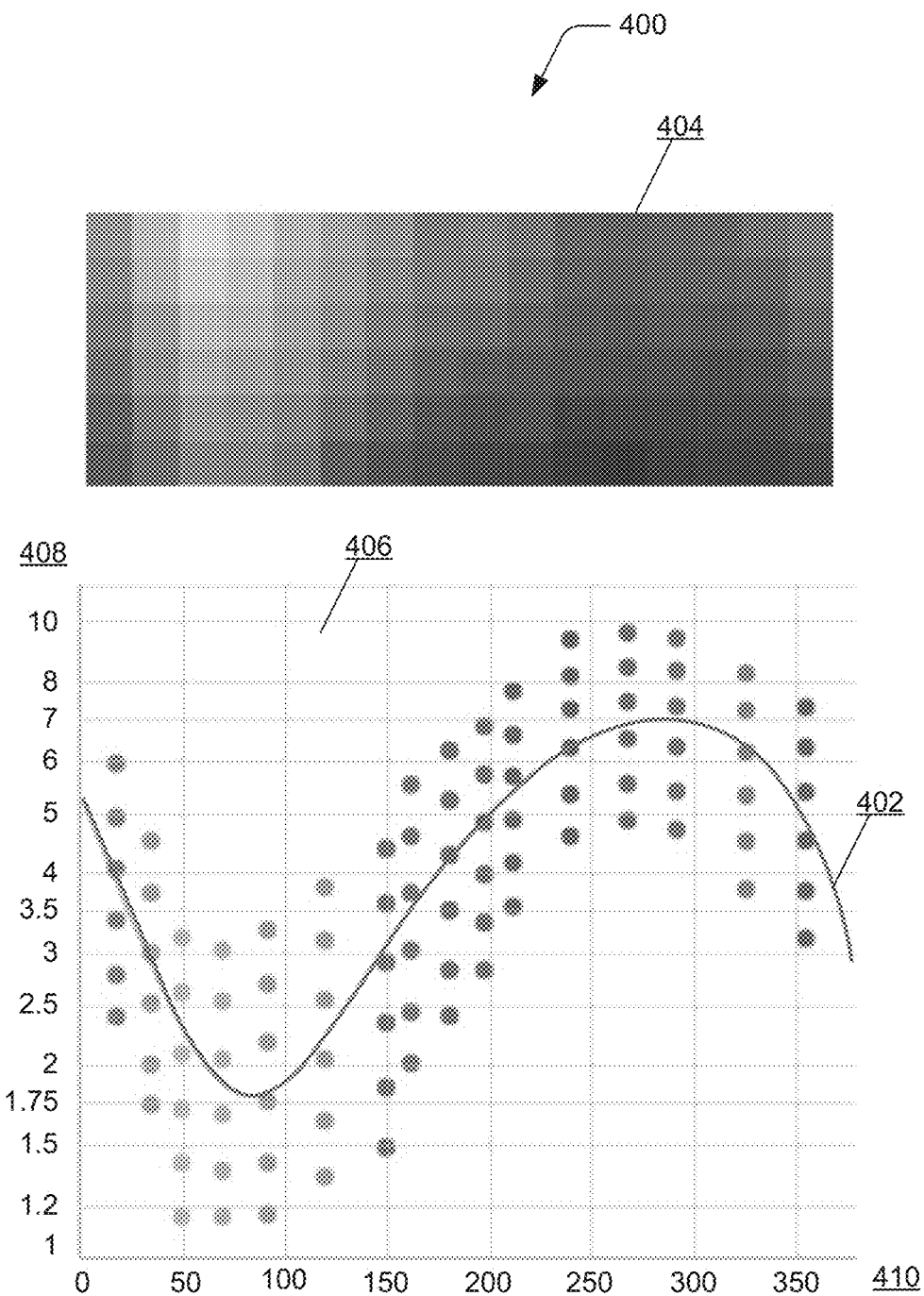
FIG. 4 illustrates a visual representation of modeled color distribution in the form of a sinusoidal curve that is representative of the colors across a color spectrum 404, as shown in a graph.

In implementations, the color generation module 304 calculates the contrast ratios 312 of respective content colors 316 in a user interface 106 based on a color target curve 322 with a multiplier value 324, where the color target curve associates the contrast ratios 312 with respective colors across a color spectrum. For example, FIG. 4 illustrates a visual representation 400 of modeled color distribution in the form of a sinusoidal curve 402 that is representative of the colors across a color spectrum 404, as shown in the graph 406. The contrast ratios 408 of selected primary and secondary colors in the color spectrum 404 are shown in the graph on the y-axis, and are mapped relative to a white background color in the graph 406, as represented by the sinusoidal curve 402 as a color target curve 322. Notably, the sinusoidal nature of the curve is representative of the fact that color spectrums span across zero (0) to three-hundred, sixty (360) degrees 410 in a cycle, as shown in the graph along the x-axis.

The sinusoidal curve 402 has conditional anomalies that are accounted for by the multiplier value 324, such as to account for areas where the curve is not completely smooth, or where the acceleration of the curve is unique. The sinusoidal curve 402 also has a modulated frequency, as the curve accelerates and decelerates along the spectrum of colors. The color generation module 304 is based on the color target curve 322 with the multiplier value 324 (also referred to as a differentiator), and provides an algorithm to identify the target contrast ratios 312 for an entire set of one or more content colors 316 across the color spectrum. For some color hue ranges, the multiplier is added based on custom polynomial equations to either increase or decrease the acceleration of the sinusoidal curve 402 in a smooth transition.

The fluidity of the sinusoidal curve 402 is based on the calculated brightness value 314 of the background color 108. The variables of the color target curve 322 (also referred to as a contrast ratio curve) is determined based on the brightness value of the background color, to include the amplitude, horizontal shift, and vertical shift for both the contrast curve and the frequency modulation curve in the following formula: r1=(hAmp*cos(x*((hFMAmp*(hFMAmp*(x*hFMPer−hFMhShift))+hFMvShift)+hFMvShift)−hShift))+hvShift, which generates the contrast ratio curve with a nested frequency modulation curve. In this formula, r1 represents the generated contrast ratio, and x is the hue degree (from 0-360 degrees) translated into radians. All of the other variables are generated using unique polynomial and sinusoidal curves that are based on the brightness of the background color.

In aspects of contrast-ratio-based color generation, the color generation module 304 is implemented to generate a family of value swatches for each color, such as a group of tints (lighter values) and shades (darker values). A mapping of the contrast ratios in a graph utilizes multipliers that increase and decrease based on the hue, which generally mirrors the curve of the target contrast ratios. The multipliers can be generated by another sinusoidal curve based on the fact that the brightness of a color generally mirrors the ratio curve. Based on the brightness of any given color, the rate of change between each value swatch can increase or decrease, where the differences are less for brighter colors and greater for darker colors. For example, in order for the color generation module 304 to generate tints, a formula: r1=c*m is used (where an initial target c=contrast ratio, m=multiplier, and r1=ratio for first tint). For subsequent tints and shades, the formula would simply compound upon itself, and each additional tint would be generated by plugging the previous tint into the same formula: r1=c*m and r2=r1*m.

In aspects of contrast-ratio-based color generation, the color generation module 304 can also implement a curve to generate a base saturation level for any color based on its hue, and also adjust the saturation level of the color based on the brightness of the generated color within a given hue range. This provides content designers with control over the saturation levels of each color range as it gets brighter or darker. The hue value of a color can be shifted based on some hue ranges and the color brightness of the generated color. The hue and saturation of a color can be adjusted in order to create a harmonious set of values for any given color. A formula for a hue shift multiplier by brightness to calculate a hue shift is given by:

$$hS=h*((4.70994350165765*10^{-7}*cB^3)-(166543080006359*10^4*cB^2)+(0.0178698493660306*cB)+0.462515245288518)$$

where hS is the new hue, h is the input hue, and cB is the calculated brightness of the generated color. These types of conditional adjustments can be applied for a set of twelve (12) color ranges, used to define the hue ranges across three-hundred, sixty (360) degrees of hue adjustments. The color generation module 304 is implemented to make the color adjustments based on the hue and saturation shifts after the colors have been generated, since the adjustments are based on the brightness of a generated color, and thus the color generation module preemptively adjusts the contrast ratios for the colors that will have conditional adjustments. The contrast ratios are pre-adjusted, conditionally based on hue ranges and background brightness. The color generation module includes formulas that take into account the change in contrast ratio for each color on a range of background brightness, and then maps the difference in the generated color contrast with the target value.

In aspects of contrast-ratio-based color generation, the color generation module 304 that is implemented by the computing device 302 can receive a brightness value adjustment 326 and/or a contrast value adjustment 328 as a selectable input via the selectable controls 112 in the user interface 106 that changes the background color 108 in the user interface. The color generation module 304 can then calculate the brightness value 314 of the background color 108, as well as determine hue values 330 of the respective content colors. The color generation module 304 is implemented to calculate the contrast ratios 312 of the respective content colors 316 based on the brightness value 314 of the background color 108 and based on the determined hue values 330 of the respective content colors. In implementations, the color generation module 304 calculates the contrast ratios 312 of the respective content colors based on the color target curve 322 with the multiplier value 324 as described above.

The color generation module 304 can then generate color values (e.g., RGB values) for the content colors 316 based on the calculated contrast ratios 312 of the respective content colors. The color generation module 304 can also generate the content colors 316 based on the hue shift 318 and the saturation shift 320 of the respective content colors. The color generation module 304 can calculate respective brightness values of new content colors based on the generated color values for the new content colors, and then adjust a saturation and/or hue of the new content colors based on the calculated respective brightness values of the new content colors. The new content colors are then scalable based on the hue shift and the saturation shift of the respective content colors for appearance consistency across multiple user interfaces as the color hues 332. The adjusted content colors can then be displayed in the user interface 106 contrasted against the background color 108 according to the calculated contrast ratios 312 of the respective content colors. In implementations, one or more of the adjusted content colors can generally display in the user interface in conformance with Web Content Accessibility Guidelines (WCAG), contingent on the device application that generates the user interface being implemented to map the new content colors in conformance with the WCAG.

Figure 5:
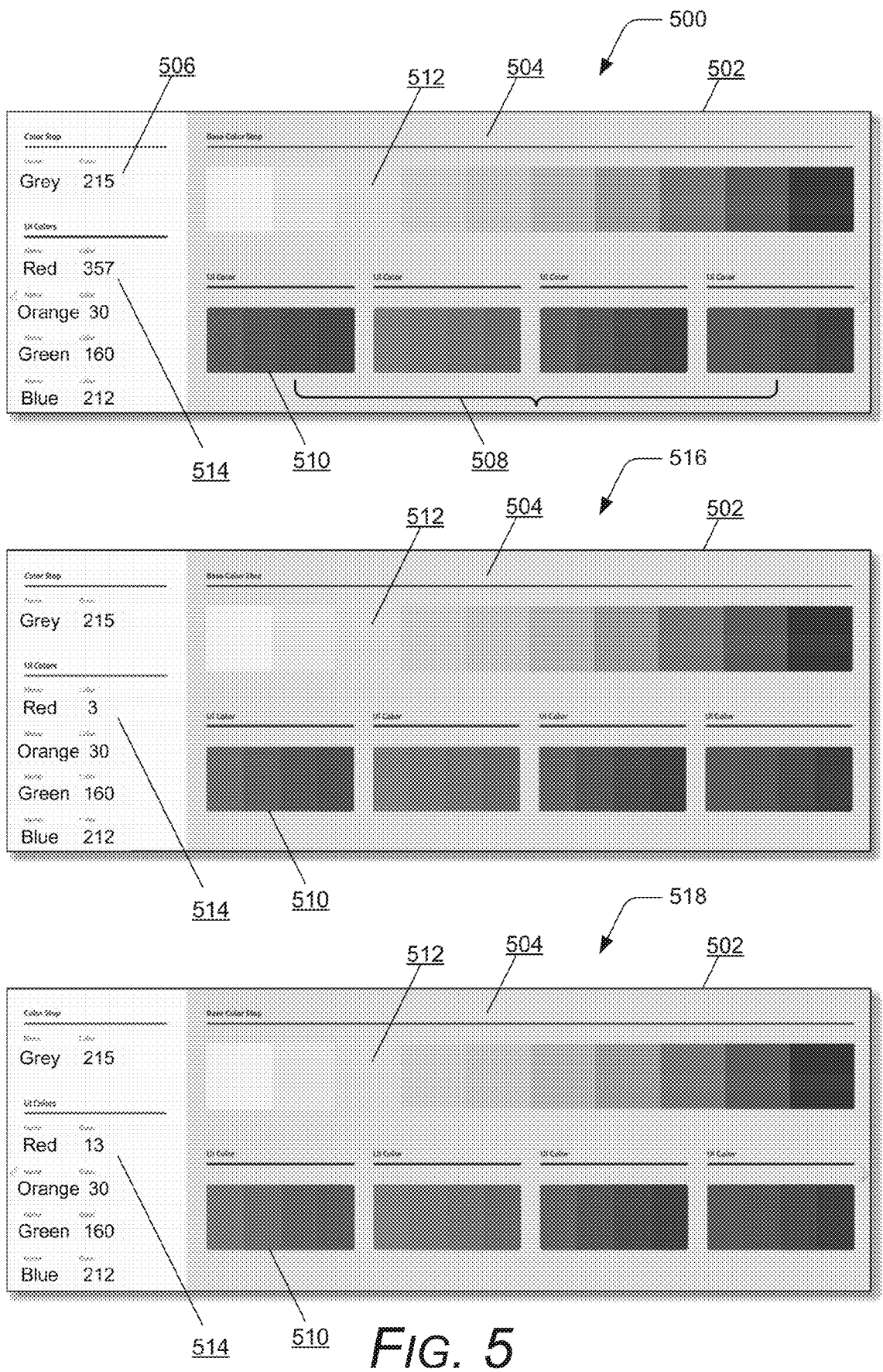
FIG. 5 illustrates an example of color generation based on a background color in accordance with implementations of contrast-ratio-based color generation.

FIG. 5 illustrates another example 500 of color generation based on a background color in accordance with implementations of contrast-ratio-based color generation. In this example 500, a user interface 502 includes a background color 504, identified as grey color #215 for the color stop 506. The user interface 502 also includes content colors 508 of other content displayed in the user interface (e.g., content colors, such as the red color 510, as well as orange, green, and blue colors in this example). A grey color swatch 512 in the grey color spectrum correlates to the grey background color 504 with a 1:1 contrast ratio, and is designated as the grey color #215. As the color stop 506 is changed, such as by user input in the user interface 502 to change the background color 504, the color generation module 304 can generate four value sets of each color (e.g., the four color hues of the red color 510) according to the calculated contrast ratios for each hue on each unique background, and adjust the colors prior to output in order to optimize their appearance using hue and saturation shifts. The content colors in the user interface 502 are based on the contrast of the respective content colors against the grey background.

In aspects of contrast-ratio-based color generation, the color generation module 304 can receive an input as the background color 504 of the user interface 502, and calculate a brightness value 314 of the background color. The color generation module can also receive an additional input that is representative of the content color, designated as the red color hue #357 as shown at 514 in the user interface 502, and the color generation module 304 determines a hue value 330 of the content color. As the designation of the red color hue is changed to the red color hue #3 as shown at 514 in the example 516, the color generation module 304 adjusts the hue of the red content color 510 in the user interface 502. Similarly, as the designation of the red color hue is changed to the red color hue #13 as shown at 514 in the example 518, the color generation module 304 readjusts the hue of the red content color 510 in the user interface 502.

In each example, the content colors 508 are adjusted over a range of multiple hues of the content colors by the color generation module 304. The adjusted content colors are displayable in the user interface 502 contrasted against the background color 504 according to the calculated contrast ratios, and one or more of the adjusted content colors are displayable in conformance with Web Content Accessibility Guidelines (WCAG). In implementations, the brightness value of the background color can limited to a brightness range that allows for generating content colors to be displayable in conformance with the WCAG 2.0 AA Guidelines. Notably, for any of the colors that are not accessible by default, users can control the color generation for accessibility, which allows the content designers to create color palettes that scale for use across multiple themes by creating unique values for each theme, while generating the colors that are perceptively the same or directly related.

The color generation module 304 is implemented to generate the multiple hues of the content colors, endeavoring to meet the WCAG requirements, although they may not always conform due to the perception of colors on varying brightness of a background color in conjunction with the individual identifiable nature of a color. The color generation module 304 can generate colors that adhere to WCAG's (AA Level) contrast ratio specifications under a few set restrictions, namely that the device application which generates the user interface already adheres to a standard for mapping the proper color value to the UI elements. The color generation module 304 generates the four different shades of the content colors, following the guidelines of a Value 1 (the lightest shade of a color) is only used for decorative purposes, and not used for text or content that needs to meet WCAG color contrast guidelines; a Value 2 (the second lightest shade of a color) is used for large-size text, per WCAG guideline 1.4.3; a Value 3 (the second darkest shade of a color) is used for normal-size text, per WCAG guideline 1.4.3; and a Value 4 (the darkest shade of a color) is used for interactive states of content items using Value 3, such as a selectable input hover state over a selectable link displayed in normal-size text).

In addition to the guidelines, there may be restrictions as to which colors and shades of colors the color generation module 304 can realistically produce. For example, a background color with a brightness value of 127 (such as #7f7f7f) may not produce appealing colors that adhere to the WCAG contrast guidelines. The brightness value of 127 is in the middle of the scale from black to white, where most colors lose their identifiable nature when attempting to meet the required contrast ratios (some near black, some near white). This restriction is also based on design aesthetic, where a color combination will not appear well on this brightness level of a background color. Generally, the brightness ranges that meet WCAG and are deemed aesthetically acceptable are approximately between 255-171, and between 0-85.

Another of the restrictions pertaining to conformance with WCAG is that only a particular range of hues meets the standards for certain background brightnesses. For lighter backgrounds, "yellow" (as an identifiable color to a user) will always be relatively light in value, and thereby will not meet the WCAG color contrast guidelines. Similarly, the deeper blues & purple ranges on a darker background color will be questionable, but only at a degree of 0.02:1 difference in contrast ratio from the guidelines. These can differ from light to dark backgrounds, where for a light background, the contrast ratios for the Values 2 and 3 described above dip below an acceptable use between the hue ranges of approximately 24-136. Darker background colors have a separate set of hue ranges that are questionable, mainly in the range of blues & purples. In this case, yellows become much higher contrast with the background, since they need to be bright in order to be identifiably perceived by a user as "yellow". The hue ranges that become questionable are between approximately 235-316. However, as noted above for any of the colors that are not WCAG accessible by default, the color generation module 304 provides that users can control the color generation for accessibility by increasing and decreasing contrast, thereby making many more colors and background brightness ranges accessible per the WCAG.

Example methods 600 and 700 are described with reference to respective FIGS. 6 and 7 in accordance with one or more aspects of contrast-ratio-based color generation. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like.

Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
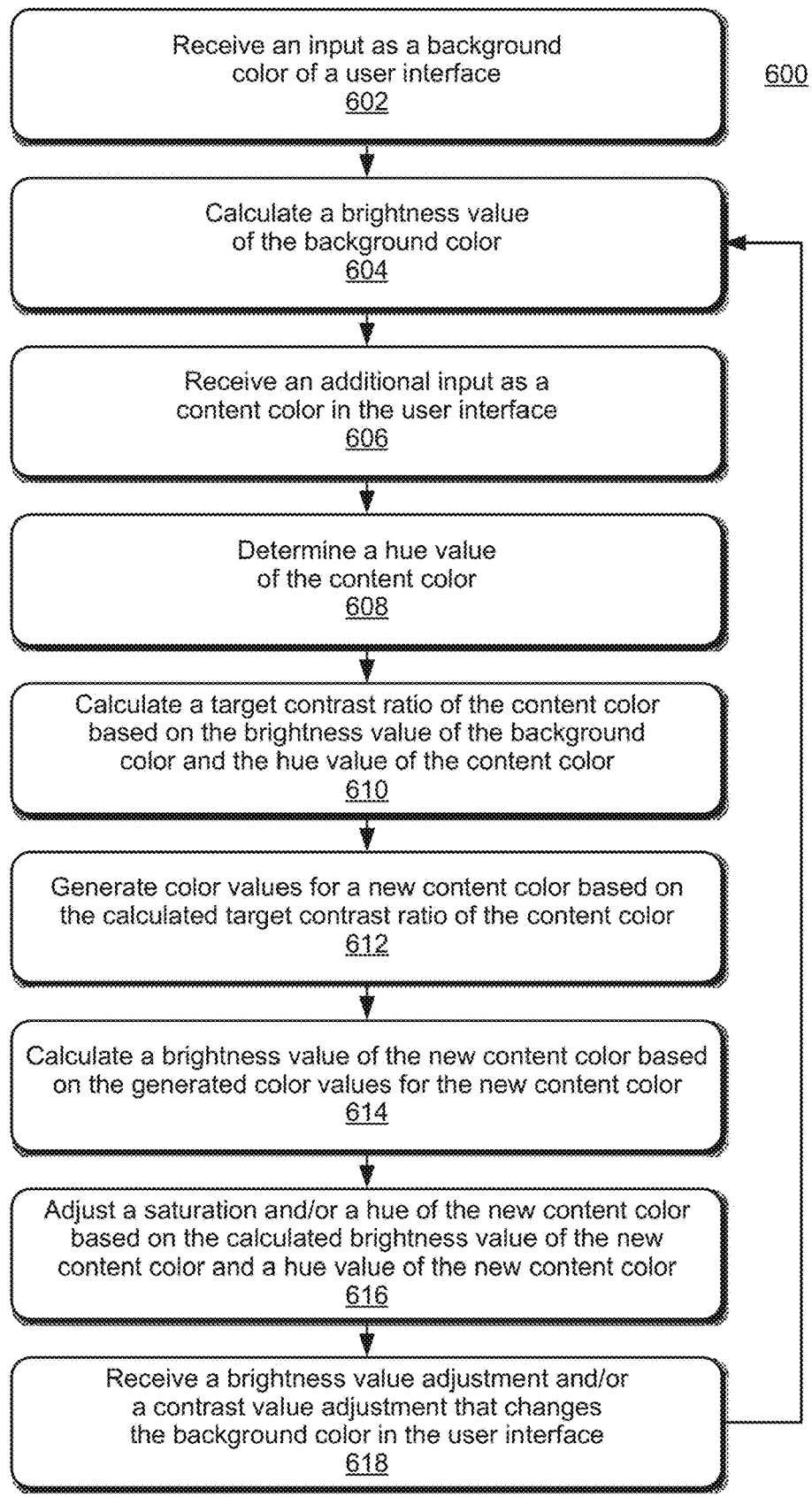
FIG. 6 illustrates an example method of contrast-ratio-based color generation in accordance with one or more implementations.

FIG. 6 illustrates an example method 600 for contrast-ratio-based color generation. The order in which the method is described is not intended to be construed as a limitation, and any number or combination of the method operations can be combined in any order to implement a method, or an alternate method.

At 602, an input is received as a background color of a user interface. For example, the color generation module 304 that is implemented by the computing device 302 receives the background color 108 of the user interface 106 as an input. At 604, a brightness value of the background color is calculated. For example, the color generation module 304 calculates the brightness value 314 of the background color 108. At 606, an additional input is received as a content color of content in the user interface. For example, the color generation module 304 receives an input of a content color 316 of other content displayed in the user interface 106. At 608, a hue value of the content color is determined. For example, the color generation module 304 determines the hue value 330 of the content color.

At 610, a target contrast ratio of the content color is calculated based on the brightness value of the background color and the hue value of the content color. For example, the color generation module 304 calculates the target contrast ratio 312 of the content color 316 based on the brightness value 314 of the background color 108 and based on the hue value 330 of the content color. The contrast ratio 312 of the content color 316 is calculated as a contrast of the content color against the background color 108. In implementations, the contrast ratio 312 of the content color 316 is calculated based on a color target curve 322 with a multiplier value 324, where the color target curve associates contrast ratios with respective colors across a color spectrum.

At 612, color values for a new content color are generated based on the calculated target contrast ratio of the content color. For example, the color generation module 304 generates color values for the content color 316 (e.g., a new content color) based on the calculated target contrast ratio 312 of the content color. At 614, a brightness value of the new content color is calculated based on the generated color values for the new content color. For example, the color generation module 304 calculates the brightness value 314 of the new content color based on the generated color values for the new content color (at 612). At 616, a saturation and/or a hue of the new content color is adjusted based on the calculated brightness value of the new content color and a hue value of the new content color. For example, the color generation module 304 adjusts the saturation and/or the hue of the new content color based on the calculated brightness value 314 of the new content color and a hue value 330 of the new content color.

The new content color can further be adjusted based on a hue shift 318 and a saturation shift 320 of the content color effective to optimize an appearance of the content color. The content color is adjusted over a range of multiple color hues 332 of the content color, such as to generate four values of any given color, as shown and described with reference to FIG. 5. The adjusted content color is displayable in the user interface contrasted against the background color according to the calculated contrast ratio, and the adjusted content color may be displayable in conformance with Web Content Accessibility Guidelines (WCAG). The brightness value of the background color is limited to a brightness range that allows for generating content colors to be displayable in conformance with the WCAG 2.0 AA Guidelines. A highest contrast color value of the content color can be used to display small text in the user interface, and a second highest contrast color value of the content color can be used to display large text in the user interface.

At 618, a brightness value adjustment and/or a contrast value adjustment is received that changes the background color in the user interface. For example, the color generation module 304 receives a brightness value adjustment 326 and/or a contrast value adjustment as a selectable input via the selectable controls 112 in the user interface 106 that changes the background color 108 in the user interface. The method of the color generation module 304 continues at 604 to recalculate the brightness value of the background color; at 610 to recalculate the target contrast ratio of the content color based on the recalculated brightness value of the background color and the hue value of the content color; at 612 to generate the color values for the content color based on the recalculated target contrast ratio of the content color; at 614 to calculate the brightness value of the content color based on the generated color values for the content color; and at 616 to adjust the saturation and/or the hue of the content color based on the calculated brightness value of the content color and the hue value of the content color.

Figure 7:
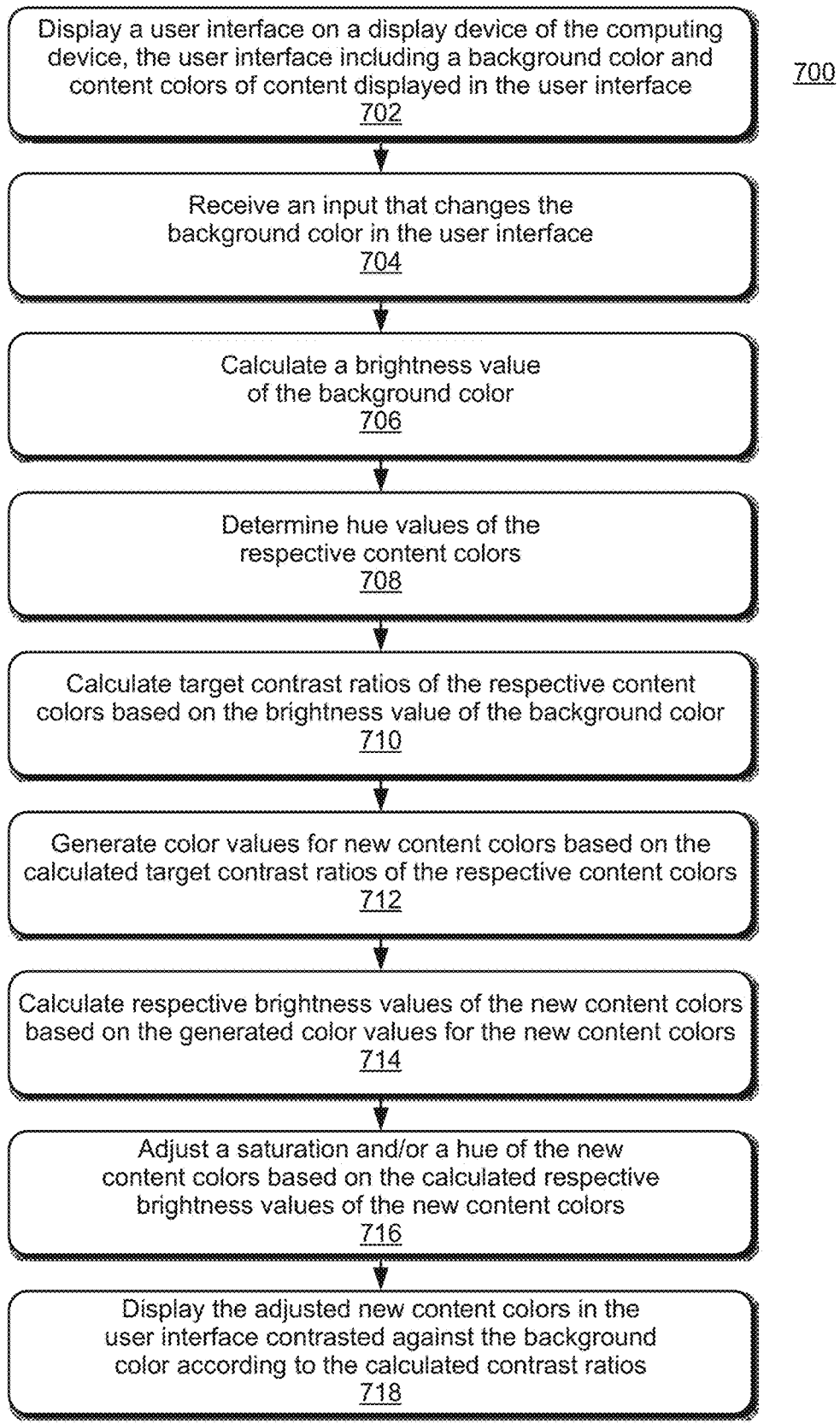
FIG. 7 illustrates an example method of contrast-ratio-based color generation in accordance with one or more implementations.

FIG. 7 illustrates an example method 700 for contrast-ratio-based color generation. The order in which the method is described is not intended to be construed as a limitation, and any number or combination of the method operations can be combined in any order to implement a method, or an alternate method.

At 702, a user interface is displayed on a display device of the computing device, the user interface including a background color and content colors of content displayed in the user interface. For example, the user interface 106 is displayed on the display device 104 of the computing device 102, and the user interface includes the background color 108 and content colors 316 of other content displayed in the user interface. At 704, an input is received that changes the background color in the user interface. For example, the color generation module 304 receives an input that changes the background color 108 in the user interface 106, such as a brightness adjustment 326 and/or a contrast adjustment 328 as selectable inputs via the selectable controls 112 in the user interface 106.

At 706, a brightness value of the background color is calculated. For example, the color generation module 304 calculates the brightness value 314 of the background color 108. At 708, hue values of the respective content colors are determined. For example, the color generation module 304 determines the hue values 330 of the respective content colors 316 of the content displayed in the user interface.

At 710, target contrast ratios of the respective content colors are calculated based on the brightness value of the background color. For example, the color generation module 304 calculates the target contrast ratios 312 of the respective content colors based on the brightness value 314 of the background color 108. The color generation module 304 can also calculate the contrast ratios 312 of the respective content colors based on the determined hue values 330 of the respective content colors. The color generation module 304 implements a color target curve 322 with a multiplier value 324, where the color target curve associates the contrast ratios 312 with the respective content colors across a color spectrum.

At 712, color values for new content colors are generated based on the calculated target contrast ratios of the respective content colors. For example, the color generation module 304 generates color values for new content colors based on the calculated target contrast ratios 312 of the respective content colors. At 714, respective brightness values of the new content colors are calculated based on the generated color values for the new content colors. For example, the color generation module 304 calculates the respective brightness values of the new content colors based on the generated color values for the new content colors (at 712). At 716, a saturation and/or a hue of the new content colors is adjusted based on the calculated respective brightness values of the new content colors. For example, the color generation module 304 adjusts the saturation and/or the hue of the new content colors based on the calculated respective brightness values of the new content colors. The color generation module 304 can further adjust the content colors based on a hue shift 318 and a saturation shift 320 of the respective content colors, where the content colors are scalable based on the hue shift and the saturation shift of the respective content colors for appearance consistency across multiple user interfaces.

At 714, the adjusted content colors are displayed in the user interface contrasted against the background color according to the calculated contrast ratios, where one or more of the adjusted content colors are displayable in conformance with Web Content Accessibility Guidelines (WCAG). For example, the user interface 106 is displayed on the display device 104 of the computing device 102, and the content colors 316 are displayed in the user interface 106 contrasted against the background color 108 (e.g., the grey color) according to the calculated contrast ratios 312. In implementations, the adjusted content colors may be displayable in conformance with WCAG.

Figure 8:
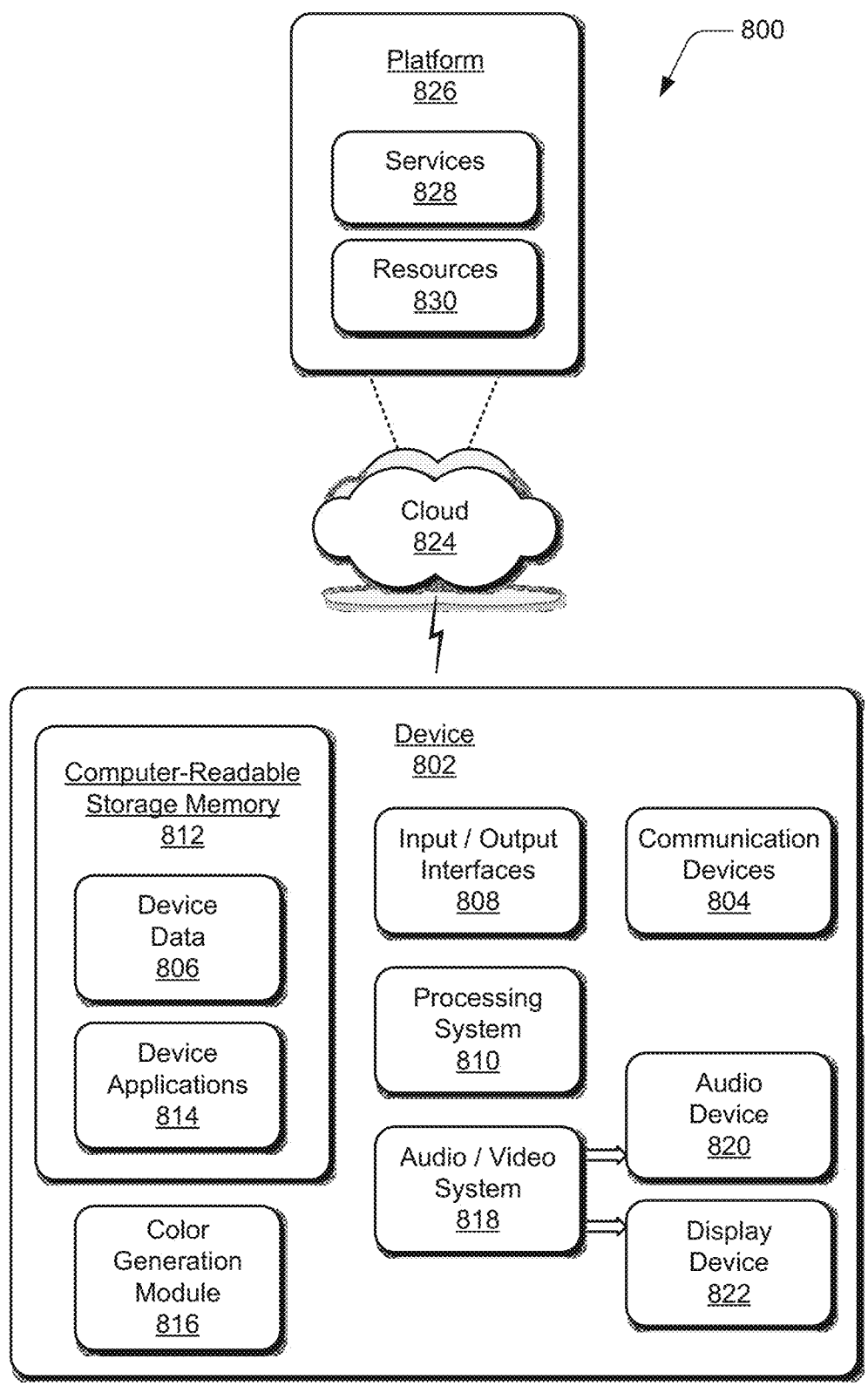
FIG. 8 illustrates an example system with an example device that can implement aspects of contrast-ratio-based color generation.

FIG. 8 illustrates an example system 800 that includes an example device 802, which can implement techniques of contrast-ratio-based color generation. The example device 802 can be implemented as any of the computing devices, mobile devices, server devices, and/or services described with reference to the previous FIGS. 1-7, such as any type of computing device, client device, mobile phone, tablet, communication, entertainment, gaming, media playback, and/or other type of device. For example, the computing device 102 and the computing device 302 may be implemented as the example device 802.

The example device 802 includes communication devices 804 that enable wired and/or wireless communication of device data 806, such as the calculated and generated data by the color generation module that may be communicated between the devices in a network, as well as computer applications data and content that is transferred from one computing device to another, and/or synched between multiple computing devices. The device data 806 can include any type of audio, video, image, and/or graphic data that is generated by applications executing on the device. The communication devices 804 can also include transceivers for cellular phone communication and/or for network data communication.

The device 802 also includes input/output (I/O) interfaces 808, such as data network interfaces that provide connection and/or communication links between the device, data networks, and other devices. The I/O interfaces can be used to couple the device to any type of components, peripherals, and/or accessory devices, such as a digital camera device and/or computer input device that may be integrated with the example device 802. The I/O interfaces also include data input ports via which any type of data, media content, and/or inputs can be received, such as user inputs to the device, as well as any type of audio, video, and/or image data received from any content and/or data source.

The device 802 includes a processing system 810 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 802 may further include any type of a system bus or other data and command transfer system that couples the various components within the device. A system bus can include any one or combination of different bus structures and architectures, as well as control and data lines.

The example device 802 also includes computer-readable storage memory 812, such as data storage devices implemented in hardware that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory 812 can include various implementations of random access memory (RAM), read-only memory (ROM), flash memory, and other types of storage memory in various memory device configurations.

The computer-readable storage memory 812 provides storage of the device data 806 and various device applications 814, such as an operating system that is maintained as a software application with the computer-readable storage memory and executed by the processing system 810. In this example, the device 802 includes a color generation module 816 that implements aspects and the described techniques of contrast-ratio-based color generation, and may be implemented with hardware components and/or in software as one of the device applications 814, such as when the example device 802 is implemented as the computing device 102 or as the computing device 302 shown and described with reference to FIGS. 1-7. An example of the color generation module 816 is the color generation module 304 that is implemented as a software application and/or as hardware components in the computing device 102 or in the computing device 302. In implementations, the color generation module 816 may include independent processing, memory, and logic components as a computing and/or electronic device integrated with the device 802.

The device 802 also includes an audio and/or video system 818 that generates audio data for an audio device 820 and/or generates display data for a display device 822. The audio device and/or the display device include any devices that process, display, and/or otherwise render audio, video, display, and/or image data. In implementations, the audio device and/or the display device are integrated components of the example device 802. Alternatively, the audio device and/or the display device are external, peripheral components to the example device. In embodiments, at least part of the techniques described for contrast-ratio-based color generation may be implemented in a distributed system, such as over a "cloud" 824 in a platform 826. The cloud 824 includes and/or is representative of the platform 826 for services 828 and/or resources 830.

The platform 826 abstracts underlying functionality of hardware, such as server devices (e.g., included in the services 828) and/or software resources (e.g., included as the resources 830), and connects the example device 802 with other devices, servers, etc. The resources 830 may also include applications and/or data that can be utilized while computer processing is executed on servers that are remote from the example device 802. Additionally, the services 828 and/or the resources 830 may facilitate subscriber network services, such as over the Internet, a cellular network, or Wi-Fi network. The platform 826 may also serve to abstract and scale resources to service a demand for the resources 830 that are implemented via the platform, such as in an interconnected device embodiment with functionality distributed throughout the system 800. For example, the functionality may be implemented in part at the example device 802 as well as via the platform 826 that abstracts the functionality of the cloud 824.

Although implementations of contrast-ratio-based color generation have been described in language specific to features and/or methods, the appended claims are not necessarily limited to the specific features or methods described. Rather, the specific features and methods are disclosed as example implementations of contrast-ratio-based color generation, and other equivalent features and methods are intended to be within the scope of the appended claims. Further, various different examples are described and it is to be appreciated that each described example can be implemented independently or in connection with one or more other described examples.

The invention claimed is:

1. In a digital medium environment for contrast-ratio-based color generation, a method implemented by a computing device, the method comprising:
    displaying a user interface on a display device of the computing device, the user interface including a background color and content colors of content displayed in the user interface;
    receiving an input that changes the background color in the user interface;
    calculating a brightness value of the background color;
    calculating target contrast ratios of the respective content colors based on the brightness value of the background color;
    generating color values for new content colors based on the calculated target contrast ratios of the respective content colors;
    calculating respective brightness values of the new content colors based on the generated color values for the new content colors; and
    adjusting a saturation of the new content colors based on the calculated respective brightness values of the new content colors.

2. The method as recited in claim 1, further comprising:
    determining hue values of the respective content colors; and wherein
    the calculating of the contrast ratios of the respective content colors is based on the brightness value of the background color and based on the determined hue values of the respective content colors.

3. The method as recited in claim 1, further comprising: adjusting a hue of the new content colors based on the calculated respective brightness values of the new content colors.

4. The method as recited in claim 3, wherein the new content colors are scalable based on a hue shift and a saturation shift of the respective new content colors for appearance consistency across multiple user interfaces.

5. The method as recited in claim 1, further comprising: adjusting a saturation of the new content colors based on the calculated respective brightness values of the new content colors.

6. The method as recited in claim 1, wherein the calculating of the contrast ratios of the respective content colors is based on a color target curve with a multiplier value, the color target curve associating the contrast ratios with the respective content colors across a color spectrum.

7. The method as recited in claim 1, further comprising: displaying the adjusted new content colors in the user interface contrasted against the background color according to the calculated contrast ratios, wherein one or more of the adjusted new content colors are displayable in conformance with Web Content Accessibility Guidelines (WCAG).

8. The method as recited in claim 1, further comprising:
receiving a brightness value adjustment that changes the background color in the user interface;
recalculating the brightness value of the background color;
recalculating the target contrast ratios of the respective new content colors based on the recalculated brightness value of the background color;
generating other color values for revised content colors based on the recalculated target contrast ratios of the respective new content colors;
calculating respective brightness values of the revised content colors based on the generated other color values for the revised content colors;
adjusting a saturation of the revised content colors based on the calculated respective brightness values of the revised content colors; and
adjusting a hue of the revised content colors based on the calculated respective brightness values of the revised content colors.

9. The method as recited in claim 1, further comprising:
receiving a contrast value adjustment that changes the brightness of the background color in the user interface;
recalculating the brightness value of the background color;
recalculating the target contrast ratios of the respective new content colors based on the recalculated brightness value of the background color;
generating other color values for revised content colors based on the recalculated target contrast ratios of the respective new content colors;
calculating respective brightness values of the revised content colors based on the generated other color values for the revised content colors; and
adjusting a saturation of the revised content colors based on the calculated respective brightness values of the revised content colors.

10. In a digital medium environment for contrast-ratio-based color generation, a method of a color generation module implemented by a computing device, the method comprising:
receiving an input as a background color of a user interface;
calculating a brightness value of the background color;
receiving an additional input as a content color of content in the user interface;
determining a hue value of the content color;
calculating a target contrast ratio of the content color based on the brightness value of the background color and the hue value of the content color;
generating color values for a new content color based on the calculated target contrast ratio of the content color;
calculating a brightness value of the new content color based on the generated color values for the new content color; and
adjusting at least one of a saturation and a hue of the new content color based on the calculated brightness value of the new content color and a hue value of the new content color.

11. The method as recited in claim 10, wherein the new content color is scalable based on a hue shift and a saturation shift of the new content color for appearance consistency across multiple user interfaces.

12. The method as recited in claim 10, wherein the contrast ratio of the content color is calculated as a contrast of the content color against the background color.

13. The method as recited in claim 10, wherein the calculating of the target contrast ratio of the content color is based on a color target curve with a multiplier value, the color target curve associating contrast ratios with respective colors across a color spectrum.

14. The method as recited in claim 10, wherein the adjusted new content color is displayable in the user interface contrasted against the background color according to the calculated contrast ratio, the adjusted new content color displayable in conformance with Web Content Accessibility Guidelines (WCAG).

15. The method as recited in claim 14, wherein the brightness value of the background color is limited to a brightness range that allows for generating content colors to be displayable in conformance with the WCAG 2.0 AA Guidelines.

16. The method as recited in claim 10, wherein the new content color is adjusted over a range of multiple hues of the content color.

17. The method as recited in claim 10, further comprising:
receiving a brightness value adjustment that changes the background color in the user interface;
recalculating the brightness value of the background color;
recalculating the target contrast ratio of the new content color based on the recalculated brightness value of the background color and the hue value of the new content color;
generating other color values for a revised content color based on the recalculated target contrast ratio of the new content color;
calculating a brightness value of the revised content color based on the generated other color values for the revised content color; and
adjusting at least one of a saturation and a hue of the revised content color based on the calculated brightness value of the revised content color and a hue value of the revised content color.

18. The method as recited in claim 10, further comprising:
receiving a contrast value adjustment that changes the background color in the user interface;

recalculating the brightness value of the background color;

recalculating the target contrast ratio of the new content color based on the recalculated brightness value of the background color and the hue value of the new content color;

generating other color values for a revised content color based on the recalculated target contrast ratio of the new content color;

calculating a brightness value of the revised content color based on the generated other color values for the revised content color; and adjusting at least one of a saturation and a hue of the revised content color based on the calculated brightness value of the revised content color and a hue value of the revised content color.

19. A computing device implemented for contrast-ratio-based color generation, the computing device comprising:

a display device to display a user interface having a background color, the user interface including content colors of content displayed in the user interface;

a processor system configured to execute a color generation module implemented to perform operations comprising to:

receive an input that changes the background color in the user interface;

calculate a brightness value of the background color;

calculate target contrast ratios of the respective content colors based on the brightness value of the background color;

generate color values for new content colors based on the calculated target contrast ratios of the respective content colors;

calculate respective brightness values of the new content colors based on the generated color values for the new content colors; and adjust at least one of a saturation and a hue of the new content colors based on the calculated respective brightness values of the new content colors.

20. The computing device as recited in claim 19, wherein the color generation module is implemented to:

receive a brightness value adjustment or a contrast value adjustment as a selectable input that changes the background color in the user interface;

recalculate the brightness value of the background color;

recalculate the target contrast ratios of the respective new content colors based on the recalculated brightness value of the background color;

generate other color values for revised content colors based on the recalculated target contrast ratios of the respective new content colors;

calculate respective brightness values of the revised content colors based on the generated other color values for the revised content colors; and adjust at least one of a saturation and a hue of the revised content colors based on the calculated respective brightness values of the revised content colors and respective hue values of the revised content colors, the adjusted revised content colors being displayable in the user interface.

* * * * *